US008326919B1

(12) United States Patent
Takkallapally et al.

(10) Patent No.: US 8,326,919 B1
(45) Date of Patent: Dec. 4, 2012

(54) NETWORK ADDRESS TRANSLATION AUTO-DISCOVERY IN DATA STORAGE NETWORKS

(75) Inventors: Anirudh Takkallapally, Natick, MA (US); Scott Joyce, Foxboro, MA (US); Sreenath Rajagopal, Natick, MA (US); Bruce Rabe, Dedham, MA (US); Greg Lazar, Upton, MA (US)

(73) Assignee: EMC Corporation, Hopkinton, MA (US)

( * ) Notice: Subject to any disclaimer, the term of this patent is extended or adjusted under 35 U.S.C. 154(b) by 351 days.

(21) Appl. No.: 12/644,237

(22) Filed: Dec. 22, 2009

(51) Int. Cl.
*G06F 15/16* (2006.01)
(52) U.S. Cl. ..................................... 709/203
(58) Field of Classification Search .................. 709/203
See application file for complete search history.

(56) References Cited

U.S. PATENT DOCUMENTS

| 6,128,298 | A * | 10/2000 | Wootton et al. ............. 370/392 |
| 6,128,664 | A * | 10/2000 | Yanagidate et al. .......... 709/228 |
| 7,523,187 | B1 * | 4/2009 | Lavallee et al. ............. 709/223 |
| 2004/0249974 | A1 * | 12/2004 | Alkhatib et al. ............. 709/245 |
| 2005/0273645 | A1 * | 12/2005 | Satran et al. ................ 714/4 |

OTHER PUBLICATIONS

"EMC CLARiiON Storage System Fundamentals for Performance and Availability," EMC Corporation, 2009, 132 pages.
"Securely Managing EMC CLARiiON Storage Systems: A Detailed Review," EMC Corporation, White Paper, Jul. 2007, pp. 1-25.

* cited by examiner

*Primary Examiner* — John MacIlwinen
(74) *Attorney, Agent, or Firm* — BainwoodHuang

(57) ABSTRACT

Embodiments of the invention relate to a method for discovering a network address translation (NAT) network connection with a data storage system. The method includes establishing, by a client device, a network connection with the data storage system via a target network address associated with the data storage system, retrieving over the network connection, by the client device, a set of private network addresses associated with a set of storage processors of the data storage system, comparing, by the client device, each private network address of the set of private network addresses associated with the set of storage processors with the target network address, and when the target network address is absent from the set of private network addresses associated with the set of storage processors as a result of the comparison, detecting, the network connection as being configured as a NAT mode network connection with the data storage system.

19 Claims, 5 Drawing Sheets

NETWORK ADDRESS TRANSLATION AUTO-DISCOVERY IN DATA STORAGE NETWORKS

BACKGROUND

A typical data storage system stores and retrieves data for one or more external host devices. Conventional data storage systems typically include a storage processor and an array of disk drives electrically coupled to the storage processor. The storage processor includes one or more ports, such as Fibre Channel ports, that allow the host devices to connect to the storage processor and is typically configured to perform load and store operations on the array of disk drives on behalf of the host devices.

In certain data storage systems, in order to hide a range of private network addresses behind a single public network address, the data storage system includes one or more communication devices, such as routers, that utilize a network address translation (NAT) procedure. In one arrangement, a data storage system such as the CLARiiON™ system produced by EMC Corporation of Hopkinton, Mass., utilizes a data communications device, disposed in electrical communication with the host device, to perform the NAT procedure on communications between a client device and the host device. For example, when initially accessing a privately networked CLARiiON™ system, a client device on a public network uses a public Internet Protocol (IP) destination address to transmit a connection request packet to the CLARiiON™ system. The data communication device receives the packet and, using the NAT procedure, translates the public IP destination address in the packet header to a private IP destination address of the CLARiiON™ system's host device. The data communication device then routes the packet to the host device for establishment of a network connection between the public and private network devices In such a configuration, the client device cannot directly access the host device using the private IP addresses of the host device. Accordingly, by masking internal host devices from an external network, the data communication device allows the internal host devices to have class C IP addresses while masquerading under a single IP address.

SUMMARY

In certain CLARiiON™ systems, such as those utilizing the Navisphere™ communication protocol, once a network communication session has been established between the client device and the host device, the CLARiiON™ system allows the client device to access the storage processors of a single storage subsystem in an off array manner. In one arrangement, in order to establish a connection with a particular set of storage processors of a single storage subsystem, the client device must provides a connection request to the CLARiiON™ system with certain requirements. For example, the client device provides to the CLARiiON™ system a notification that a connection is being made in NAT mode as well as the NAT IP address of each storage processor (i.e., SP A and SP B) of the single storage system. The data communication device associated with the CLARiiON™ system receives the NAT IP addresses, translates the NAT IP addresses to the actual IP addresses associated with each storage processor, and transmits the connection request to the storage subsystem. Once a connection has been established between the client device and the storage subsystem, the client device can manage the single storage system through the data communications device.

With such an arrangement, the data communication device provides a level of data security to the data storage system because the client device accesses the storage subsystems via the data communication device ports rather than directly through the storage subsystems addresses. However, when connecting to a storage subsystem in NAT mode, the CLARiiON™ system requires that the user knows that the subsystem is behind NAT and that the user explicitly informs the CLARiiON™ system that a connection is being made in NAT mode. Such requirements can be cumbersome to the user. Additionally, conventional CLARiiON™ systems do not support domains that require the user to enter the NAT address for every node in the domain. Accordingly, the client device can only connect to a subsystem behind NAT using an off-array mode, as opposed to an on array mode, such as by using a browser and Uniform Resource Locator (URL). Furthermore, during operation, the user is required to provide the NAT IP address of each storage processor (i.e., SP A and SP B) of a storage system at startup. Requiring the user to remember and provide this information to establish a communications connection can be cumbersome.

By contrast, embodiments of the present invention are related to network address translation (NAT) auto-discovery in a client device. For example, in one arrangement, after the client device establishes a network connection with a host device, such as a CLARiiON™ host device configured with the Navisphere™ communication protocol, the client device retrieves the private IP addresses of the storage processors of the data storage system. Based upon the retrieved private IP addresses, the client device can automatically detect if the storage processors are connected to the host device behind a NAT. When the client device detects the storage processors as being connected behind a NAT, the client device provides an end user with a user interface (i.e., on array), such as a graphical user interface, that allows the end user to access a storage processor directly through its public IP addresses. When connecting to the storage processor, the user does not have to be aware that the storage processor is located behind a NAT and does not have to provide the NAT addresses of the storage processor to the host device for storage processor access. Accordingly, with the client device configured to automatically discover the presence of a NAT in the data storage system, the client device allows the user to more easily access the storage processors within the data storage system.

In one arrangement, embodiments of the invention relate to a method for discovering a network address translation (NAT) network connection with a data storage system. The method includes establishing, by a client device, a network connection with the data storage system via a target network address associated with the data storage system, retrieving over the network connection, by the client device, a set of private network addresses associated with a set of storage processors of the data storage system, comparing, by the client device, each private network address of the set of private network addresses associated with the set of storage processors with the target network address, and when the target network address is absent from the set of private network addresses associated with the set of storage processors as a result of the comparison, detecting, by the client device, the network connection as being configured as a NAT mode network connection with the data storage system.

BRIEF DESCRIPTION OF THE DRAWINGS

The foregoing and other objects, features and advantages will be apparent from the following description of particular embodiments of the invention, as illustrated in the accompanying drawings in which like reference characters refer to the same parts throughout the different views. The drawings are not necessarily to scale, emphasis instead being placed upon illustrating the principles of various embodiments of the invention.

DETAILED DESCRIPTION

Embodiments of the present invention are related to network address translation (NAT) auto-discovery in a client device. For example, in one arrangement, after the client device establishes a network connection with a host device, such as a CLARiiON™ host device configured with the Navisphere™ communication protocol, the client device retrieves the private IP addresses of the storage processors of the data storage system. Based upon the retrieved private IP addresses, the client device can automatically detect if the storage processors are connected to the host device behind a NAT. When the client device detects the storage processors as being connected behind a NAT, the client device provides an end user with a user interface (i.e., on array), such as a graphical user interface, that allows the end user to access a storage processor directly through its public IP addresses. When connecting to the storage processor, the user does not have to be aware that the storage processor is located behind a NAT and does not have to provide the NAT addresses of the storage processor to the host device for storage processor access. Accordingly, with the client device configured to automatically discover the presence of a NAT in the data storage system, the client device allows the user to more easily access the storage processors within the data storage system.

Figure 1:
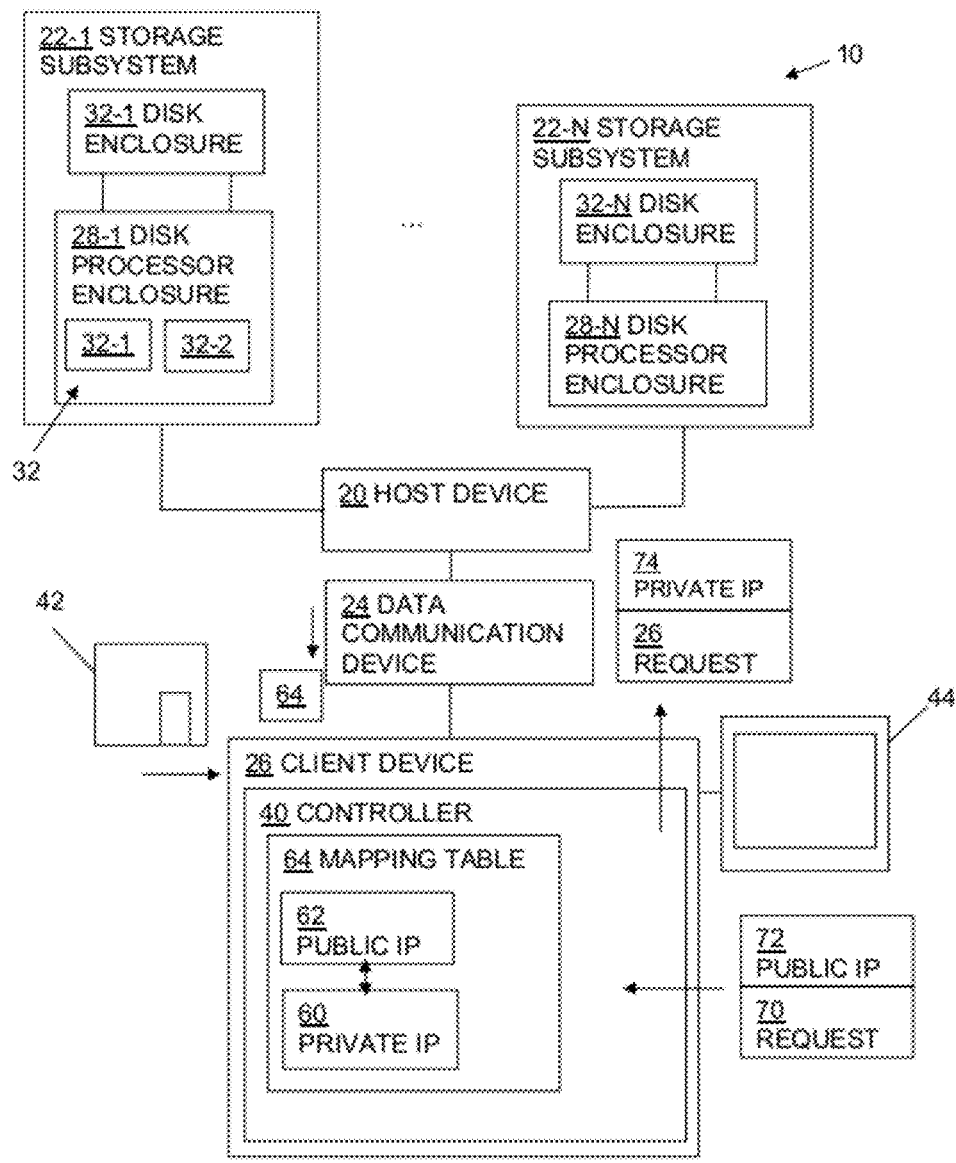
FIG. 1 illustrates a schematic representation of a client device disposed in electrical communication with a data storage system.

FIG. 1 illustrates an example arrangement of a data storage system 10, such as used by an enterprise. As shown, the data storage system 10 includes a host device 20, storage subsystems 22-1 through 22-N, collectively referenced as 22, as well as a data communication device 24, such as a router, disposed in electrical communication with the host device 20. The host device 20, storage subsystems 22, and data communication device 24 form part of a private network having restricted user access. A client device 26 communicates with the data storage system 10 and through a public network connection (e.g., via the data communication device 24.

The host device 20 is configured to perform load and store operations on the array storage subsystems 22 on behalf of the client device 26. For example, during operation, the host device 20 receives system calls or requests (e.g., open, read, and write requests) from the client device 26 for resources associated with the storage subsystems 22. The host device 20 transmits the system calls to the appropriate storage subsystem 22 within the data storage system 10. While the host device 20 can be configured in a variety of ways, in one arrangement, the host device 20 is configured as a CLARiiON™ host device that utilizes the Navisphere™ communication protocol.

Each storage subsystem 22 includes a disk processor enclosure 28 and a disk enclosure 32. Taking the storage subsystem 22-1 as an example, the disk processor enclosure 28-1 includes one or more controllers or storage processors, such as a first storage processor 32-1 and a second, peer storage processor 32-2, collectively referenced as 32. The storage processors 32 of the storage subsystem 22-1 are configured to perform load and store operations on the disk enclosure 32-1 on behalf of the host device 28. For example, the storage processors 32 receive storage requests, as generated by and transmitted from host device 20, via a storage bus and/or storage area network (SAN). The disk enclosure 32-1 includes an array of magnetic memory units or disk drives. For example, the disk enclosure 32-1 includes several disk drives operable to store data received from a host device 20 or to provide data requested from the host device 20.

The client device 26 is configured as a computerized device that includes a controller 40, such as a memory and a processor. In one arrangement, the controller 40 stores a network address translation (NAT) discovery application. The NAT discovery application installs on the client device 26 from a computer program product 42. In some arrangements, the computer program product 42 is available in a standard off-the-shelf form such as a shrink wrap package (e.g., CD-ROMs, diskettes, tapes, etc.). In other arrangements, the computer program product 42 is available in a different form, such downloadable online media. For example, the NAT discovery application can be downloaded from a web server of the data storage system 10 when the client device 26 is connected via a web browser. When performed on the controller 40 of client device 26, the NAT discovery application causes the client device 26 to automatically detect if a storage processor 32-1 is connected behind a NAT network connection (i.e., behind a private IP address). If so, the client device 26 provides an end user with a user interface, such as a graphical user interface, via a display 44 that allows the end user to access the storage processor 32-1 directly through its public IP addresses.

Figure 2:
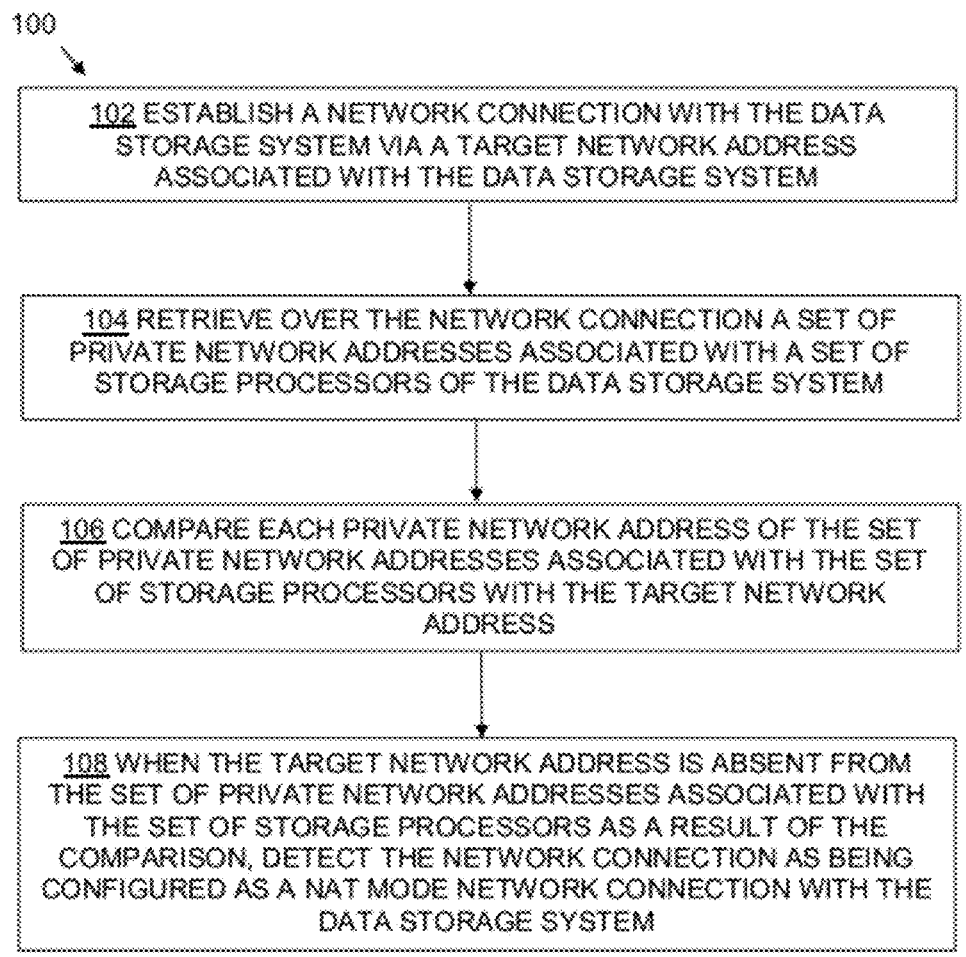
FIG. 2 is a flowchart that illustrates a procedure performed by the client device of FIG. 1.

FIG. 2 is a flowchart 100 that illustrates a procedure performed by the client device 26 when discovering a NAT network connection with a data storage system 20.

In step 102, the client device 26 establishes a network connection with the data storage system 10 via a target network address associated with the data storage system 10. For example, with reference to FIG. 3, to initiate a network connection with the data storage system 10, the client device 26 generates and displays a connection interface 50 that allows and end user to enter a target IP address, such as a public IP address associated with the data communication device 24, or name of the host device 20. In the case where the end user enters a valid target IP address or valid name of the host device 20 in an entry portion 52 and activates the connect button 54 as provided by the connection interface 50, the client device 26 engages an authentication process with the host device 20, through the data communication device 24, to establish a network connection with the host device 20.

Returning to FIG. 2, in step 102 the client device 26 retrieves over the network connection a set of private network addresses associated with a set of storage processors 32 of the data storage system 10. For example, once the client device 26 has established a network connection with the host device 20, the client device 26 transmits a request, such as a call, to the host device 20 (e.g., the NetAdminFeature of the CLARiiON™ host device) for each private IP address of each storage processor 32 associated with the data storage system 10. In response to the request, in one arrangement, the host device 20 retrieves each private IP address of each storage processor 32 and forwards a collection of private IP addresses to the client device 26.

In step 104, the client device 26 compares each private network address of the set of private network addresses associated with the set of storage processors 32 with the target network address. For example, once the client device 26 has received the collection of private IP addresses of the storage processors 32, the client device 26 checks the collection of IP addresses to detect the presence of the target IP address, such as the public IP address initially provided to the data communication device 24.

In step 106, when the target network address is absent from the set of private network addresses associated with the set of storage processors as a result of the comparison, the client device 26 detects the network connection as being configured as a NAT mode network connection with the data storage system 10. For example, based upon the results of the comparison described above, in the case where the target IP address used to establish the network connection with the host device 20 does not match an entry in the collection of IP addresses, the client device 26 detects the presence of a NAT connection associated with the storage processors 32. By contrast, in the case where the client device 26 detects a match between the target IP address used to establish the network connection with the host device 20 and an entry in the collection of IP addresses, the client device 26 detects associated the storage processor 32 as being in communication with the host device via a non-NAT connection.

By detecting the presence of a NAT connection within the data storage system 10, as will be described below, the client device 26 allows the end user to create a network connection between the client device 26 and a storage processor 32 of the data storage system 10 without requiring the end-user have knowledge that the storage processor 32 is connected behind a NAT, as is the case in certain conventional data storage systems. Accordingly, with the client device 26 configured to automatically discover the presence of a NAT in the data storage system 10, the client device 26 allows the user to more easily access the storage processors 32 within the data storage system 10.

In one arrangement, once the client device 26 has detected the presence of a NAT connection associated with the storage processors 32, the client device 26 utilizes the collection of private IP addresses of the storage processors 32 to provide direct connection between the client device 26 and any of the storage processors 32 of the data storage system 10. For example, as illustrated in FIG. 1, after the client device 26 has received the collection of private IP addresses 60 of the storage processors 32, the controller 40 of the client device 26 maps or correlates a corresponding set of pubic IP addresses 62 associated with the storage processors 32 to the private IP addresses 60. Accordingly, for the private IP address 60 of each storage processor 32 in the data storage system 10, the controller 40 of client device 26 stores a corresponding public IP address 62 of each storage processor 32 as part of a mapping table 64. Alternately, also as illustrated in FIG. 1, the client device 26 can dynamically retrieve the mapping table 64 from the data communication device 24. In such an arrangement, when the client device 26 receives an access request to access a storage processor 32, where the access request includes the public IP address of a storage processor 32, the client device 26 can utilize the mapping table 64 to provide delivery of the access request to the storage processor.

For example, with continued reference to FIG. 1, assume an end user would like to access the first storage processor 32-1 of the storage subsystem 22-1. When the client device 26 detects the storage processors 32 as being connected behind a NAT, the client device 26 provides an end user with a connection interface 50 (i.e., on array), such as a graphical user interface illustrated in FIG. 3, that allows the end user to access a storage processor 32 directly through its public IP address. To provide an access request to access a storage processor 32-1, the end user enters a public IP address of the first storage processor 32-1 in entry portion 52, and engages the connect function 54 of the connection interface 50. Returning to FIG. 1, as a result of the end user engaging the connect function 54, the client device 26 receives the access request 70 to access the storage processor 32-1 via the public IP address 72 of the storage processor 32-1. As shown, the destination public IP address 72 forms part of a header of the access request 70.

Once the client device 26 receives the access request 70, the client device 26 accesses the mapping table 64 and retrieves a private network address 74 of the storage processor 32-1 that corresponds to the public network address 72. The client device 26 then replaces the public IP address 72 in the header of the access request with the private IP address 74 of the storage processor 32-1 and transmits the access request 70 to the storage processor 32-1 via the private network address 74 of the storage processor 32-1. Accordingly, because the client device 26 performs the mapping of a public IP address with the private IP address, the end user can directly access the storage processor 32-1 without having to be aware that the storage processor 32-1 is located behind a NAT and without having to provide the NAT addresses of the storage processor 32-1 to the client device 26 for access to the storage processor 32-1.

As indicated above, with reference to FIG. 1, the disk processor enclosure 28-1 includes the first storage processor 32-1 and the second storage processor 32-2 which is configured as a peer to the first storage processor 32-1. Conventionally, in the event that the first storage processor 32-1 were to fail, the second storage processor 32-2 is configured to perform load and store operations on the disk array carried by the disk enclosure 32-1 on behalf of the host device 20. However, in the present case, both of the storage processors 32-1, 32-2 are located behind a NAT. In order to allow an end user to continue communication with the disk enclosure 32-1 when the first storage processor 32-1 fails and without requiring the end user to determine if the second storage processor 32-2 uses NAT, the client device 26 is configured to request the public IP address of second storage processor 32-2.

Figure 4:
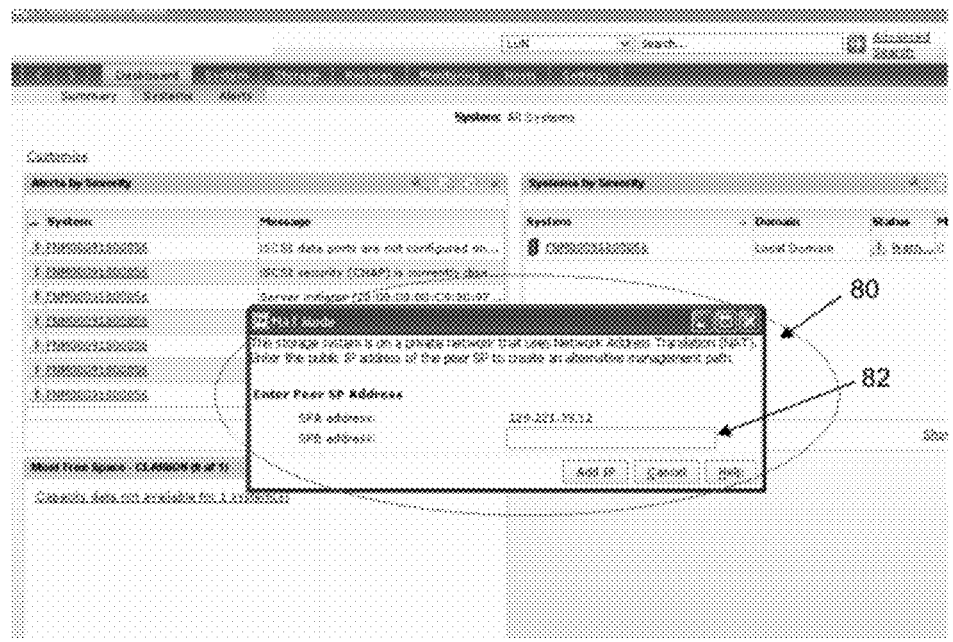
FIG. 4 illustrates an example of a user interface provided by the client device of FIG. 1 that allows an end user to associate a public IP address of a peer storage processor of a storage subsystem of the data storage system with a primary storage processor of the storage subsystem of the data storage system.

For example, with reference to FIG. 4, after the client device 26 has established a network communication connection with the storage processor 32-1 as a result of transmitting the access request 70, in one arrangement, the client device 26 provides the end user with a storage processor management interface 80 to request the public IP address of the second, peer storage processor 32-1. When the end user enters the public IP address of the second storage processor 32-2 within entry portion 82, the client device 26 receives the public IP address and, in one arrangement, associates the public IP address of the second storage processor 32-2 with the public IP address of the first storage processor 32-1. Accordingly, if the first storage processor 32-1 were to fail, in the case where the client device 26 received requests destined for the public IP address of the first storage processor 32-1, based upon the association, the client device 26 forwards the requests to the second storage processor 32-2 via the public IP address of the second storage processor 32-2. Accordingly, in this arrangement the client device 26 creates an alternate network communication path between the storage subsystem 22-1 and the client device 26 in the event of a failure of the first storage processor 32-1.

Figure 5:
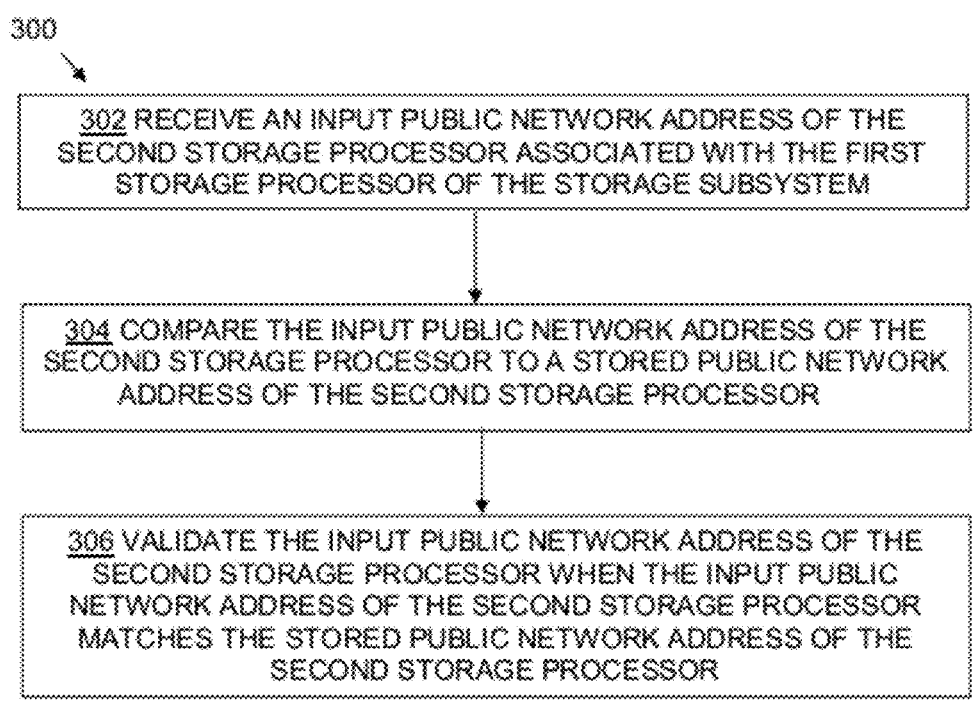
FIG. 5 is a flow chart that illustrates a procedure performed by the client device of FIG. 1.

In one arrangement, in order to minimize errors and to ensure that the public IP address of the second storage processor 32-2 entered by the end user is correct, the client device 26 is configured to validate the public IP address of the second storage processor 32-2. For example, FIG. 5 is a flowchart 300 that illustrates a procedure performed by the client device 26 when validate the public IP address of the second storage processor 32-2.

In step 302, the client device 26 receives an input public network address of the second storage processor 32-2 associated with the first storage processor 32-1 of the storage subsystem 22-1. For example, in response to providing an end user with a storage processor management interface 80 to request the public IP address of the second, peer storage processor 32-1, the end user enters and transmits the public IP address of the second storage processor 32-2 to the client device 26.

In step 304, the client device 26 compares the input public network address of the second storage processor 32-2 to a stored public network address of the second storage processor 32-2. For example, in one arrangement, the controller 40 of the client device 26 is preconfigured with a list of public network address of the storage processors 32 of the data storage system 10. After the client device 26 has received the user input public network address, the client device 26 reviews the list to detect if a match exists between the input public network address and an entry in the list.

In step 306, the client device 26 validates the input public network address of the second storage processor when the input public network address of the second storage processor matches the stored public network address of the second storage processor. For example, in the case where the client device 26 detects a match between the user input public network address and an entry in the list of public network address of the storage processors 32, the client device recognizes the input public network address as being correct.

While various embodiments of the invention have been particularly shown and described, it will be understood by those skilled in the art that various changes in form and details may be made therein without departing from the spirit and scope of the invention as defined by the appended claims.

Figure 3:
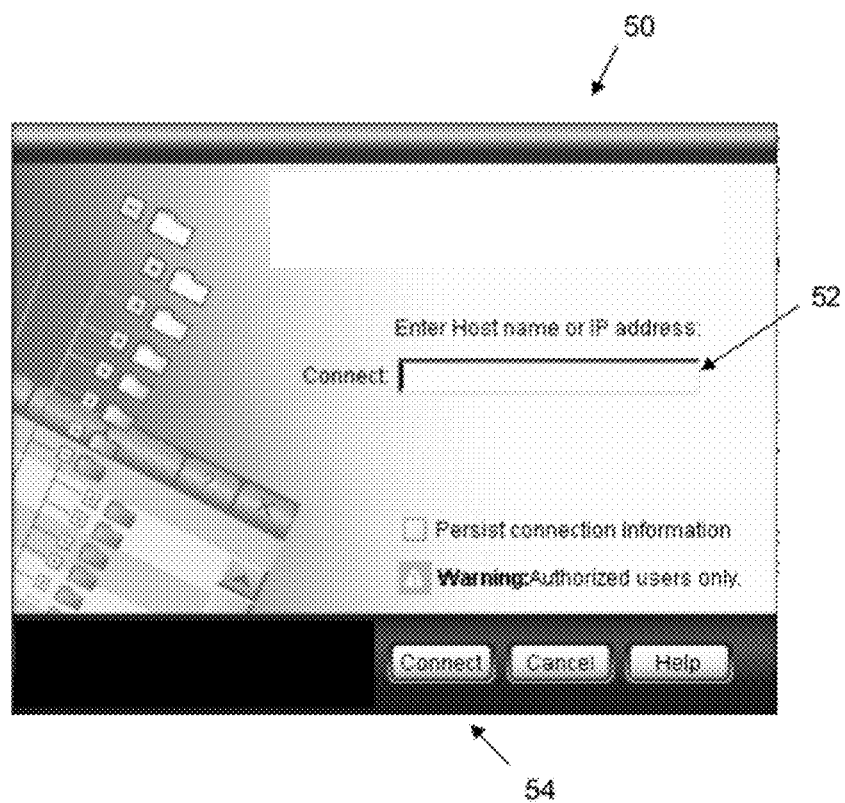
FIG. 3 illustrates an example of a user interface provided by the client device of FIG. 1 that allows an end user to access a storage processor of the data storage system.

For example, as described above, to provide an access request to access a storage processor 32-1, the end user accesses a connection interface 50 provided by the client device 26, as illustrated in FIG. 3, enters a public IP address of the first storage processor 32-1 in entry portion 52, and engages the connect function 54 of the connection interface 50. Such description is by way of example, only. In one arrangement, the connection interface 50 is configured to a Uniform Resource Locator to access the storage processor 32-1. Accordingly, the client device 26 connects to the storage processor 32-1 in an on-array mode.

As indicated above, the client device 26 is configured to discover a network address translation (NAT) network connection with a data storage system. Such indication is by way of example only. In one arrangement, the client device 26 is configured to discover Port Address Translation (PAT) and/or Port Network Address Translation (PNAT) connections with a data storage system.

What is claimed is:

1. A method for discovering a network address translation (NAT) network connection with a data storage system, comprising:

establishing, by a client device, a network connection with the data storage system via a target network address associated with the data storage system;

retrieving over the network connection, by the client device, a set of private network addresses associated with a set of storage processors of the data storage system;

comparing, by the client device, each private network address of the set of private network addresses associated with the set of storage processors with the target network address; and when the target network address is absent from the set of private network addresses associated with the set of storage processors as a result of the comparison, detecting, by the client device, the network connection as being configured as a NAT mode network connection with the data storage system;

wherein the set of private network addresses includes a first private network address and a second private network address;

wherein retrieving the set of private network addresses associated with the set of storage processors of the data storage system includes:
  storing, in a memory of the client device, the first private network address and the second private network address; and wherein comparing each private network address of the set of private network addresses associated with the set of storage processors with the target network address includes:
  checking, by the client device, the values of the first private network address and the second private network address stored in the memory of the client against the target network address.

2. The method of claim 1, comprising:

mapping, by the client device, a public network address of each storage processor of the set of storage processors to the private network address for each storage processor of the set of storage processors; and storing, by the client device, the mapping of the public network address of each storage processor and the private network address of each storage processor as a mapping table.

3. The method of claim 2, wherein mapping comprises dynamically retrieving a mapping of the public network address of each storage processor of the set of storage processors and the private network address for each storage processor of the set of storage processors from a data communication device associated with the data storage system.

4. The method of claim 2, comprising:

receiving, by the client device, an access request to access a storage processor of the set of storage processors via the public network address of the storage processor;

retrieving, by the client device from the mapping table, the private network address of the storage processor that corresponds to the public network address of the storage processor; and transmitting, by the client device, the access request to the storage processor of the set of storage processors via the private network address of the storage processor.

5. The method of claim 4, wherein receiving the access request to access the storage processor includes:
  providing, by the client device, an end user with a graphical connection interface configured to allow the end user to access the storage processor, the graphical connection interface including a connection initiator; and receiving, as the access request and by the client device, a signal from the end user that results from the end user engaging the connection initiator, the signal including the public network address of the storage processor.

6. The method of claim 5,
wherein the signal includes a header configured to contain an address;
wherein receiving the signal from the end user includes:
   reading, by the client device, the public network address of the storage processor from the header of the signal; and
wherein transmitting the access request to the storage processor includes:
   replacing, by the client device, the public network address of the storage processor with the private network address of the storage processor in the header.

7. The method of claim 1, comprising:
detecting, by the client device, a network connection to a first storage processor of a storage subsystem of the data storage system; and
requesting, by the client device, a public network address of a second storage processor associated with the first storage processor of the storage subsystem to create an alternate network communication path with the storage subsystem.

8. The method of claim 7, wherein requesting, by the client device, the public network address of the second storage processor associated with the first storage processor of the storage subsystem comprises displaying, by the client device, a storage processor management interface, the storage processor management interface requesting the public network address of the second storage processor of the storage subsystem.

9. The method of claim 7, comprising:
receiving, by the client device, an input public network address of the second storage processor associated with the first storage processor of the storage subsystem;
comparing, by the client device, the input public network address of the second storage processor to a stored public network address of the second storage processor;
validating, by the client device, the input public network address of the second storage processor when the input public network address of the second storage processor matches the stored public network address of the second storage processor.

10. The method of claim 9,
wherein comparing the input public network address of the second storage processor to the stored public network address of the second storage processor includes:
   receiving, by the client device, a list of public network addresses associated with storage processors of the set of storage processors of the data storage system; and
   reviewing, by the client device, the list of public network addresses to detect if a match exists between the input public network address and a public network address of the list of public network addresses.

11. The method of claim 1,
wherein establishing the network connection with the data storage system includes:
   initiating, by the client device, an authentication process with the data storage system; and wherein retrieving the set of private network addresses associated with the set of storage processors of the data storage system includes:
   if the authentication process is successful, obtaining, by the client device, the set of private network addresses from the data storage system; and
   if the authentication process is not successful, terminating, by the client device, the network connection.

12. A client device, comprising:
at least one communications interface; and
a controller electrically coupled to the at least one communications interface wherein the controller is configured to:
establish a network connection with a data storage system via a target network address associated with the data storage system;
retrieve over the network connection a set of private network addresses associated with a set of storage processors of the data storage system;
compare each private network address of the set of private network addresses associated with the set of storage processors with the target network address; and
when the target network address is absent from the set of private network addresses associated with the set of storage processors as a result of the comparison, detect the network connection as being configured as a NAT mode network connection with the data storage system;
wherein the set of private network addresses includes a first private network address and a second private network address;
wherein retrieving the set of private network addresses associated with the set of storage processors of the data storage system includes:
   storing, in a memory of the client device, the first private network address and the second private network address; and
wherein comparing each private network address of the set of private network addresses associated with the set of storage processors with the target network address includes:
   checking, by the client device, the values of the first private network address and the second private network address stored in the memory of the client against the target network address.

13. The client device of claim 12, wherein the controller is configured to:
map a public network address of each storage processor of the set of storage processors to the private network address for each storage processor of the set of storage processors; and
store the mapping of the public network address of each storage processor and the private network address of each storage processor as a mapping table.

14. The client device of claim 13, wherein when mapping, the controller is configured to dynamically retrieve a mapping of the public network address of each storage processor of the set of storage processors and the private network address for each storage processor of the set of storage processors from a data communication device associated with the data storage system.

15. The client device of claim 13, wherein the controller is configured to:
receive an access request to access a storage processor of the set of storage processors via the public network address of the storage processor;

retrieve from the mapping table the private network address of the storage processor that corresponds to the public network address of the storage processor; and transmit the access request to the storage processor of the set of storage processors via the private network address of the storage processor.

16. The client device of claim 12, wherein the controller is configured to:

detect a network connection to a first storage processor of a storage subsystem of the data storage system; and request a public network address of a second storage processor associated with the first storage processor of the storage subsystem to create an alternate network communication path with the storage subsystem.

17. The client device of claim 16, wherein when requesting the public network address of the second storage processor associated with the first storage processor of the storage subsystem, the controller is configured to display a storage processor management interface, the storage processor management interface requesting the public network address of the second storage processor of the storage subsystem.

18. The client device of claim 16, wherein the controller is configured to:

receive an input public network address of the second storage processor associated with the first storage processor of the storage subsystem;

compare the input public network address of the second storage processor to a stored public network address of the second storage processor;

validate the input public network address of the second storage processor when the input public network address of the second storage processor matches the stored public network address of the second storage processor.

19. A computer program product having a non-transitory computer-readable medium including computer program logic encoded thereon that, when performed on a controller of a client device causes the client device to:

establish a network connection with a data storage system via a target network address associated with the data storage system;

retrieve over the network connection a set of private network addresses associated with a set of storage processors of the data storage system;

compare each private network address of the set of private network addresses associated with the set of storage processors with the target network address; and when the target network address is absent from the set of private network addresses associated with the set of storage processors as a result of the comparison, detect the network connection as being configured as a NAT mode network connection with the data storage system;

wherein the set of private network addresses includes a first private network address and a second private network address;

wherein retrieving the set of private network addresses associated with the set of storage processors of the data storage system includes:

storing, in a memory of the client device, the first private network address and the second private network address; and wherein comparing each private network address of the set of private network addresses associated with the set of storage processors with the target network address includes:

checking, by the client device, the values of the first private network address and the second private network address stored in the memory of the client against the target network address.

* * * * *